(12) United States Patent
Robyr et al.

(10) Patent No.: US 8,316,398 B2
(45) Date of Patent: Nov. 20, 2012

(54) METHOD FOR SENDING MULTIMEDIA CONTENT TO AT LEAST ONE MULTIMEDIA UNIT, METHOD FOR PROCESSING SAID MULTIMEDIA CONTENT AND MULTIMEDIA UNIT FOR THE IMPLEMENTATION OF THESE METHODS

(75) Inventors: Sébastien Robyr, Epalinges (CH); Frédéric Thomas, Onex (CH); Wendy Molyneaux, Bioley-Orjulaz (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 973 days.

(21) Appl. No.: 12/003,235

(22) Filed: Dec. 21, 2007

(65) Prior Publication Data

US 2008/0163313 A1 Jul. 3, 2008

(30) Foreign Application Priority Data

Dec. 21, 2006 (EP) ..................................... 06126789

(51) Int. Cl.
*G06F 3/00* (2006.01)
*G06F 9/26* (2006.01)
*H04N 5/445* (2011.01)
*H04N 7/12* (2006.01)

(52) U.S. Cl. ............ 725/54; 725/50; 725/148; 725/151; 711/206; 375/240.01

(58) Field of Classification Search ............... 725/50, 725/54, 67, 68, 70, 71, 148, 151; 375/240.01; 711/206

See application file for complete search history.

(56) References Cited

U.S. PATENT DOCUMENTS

| | | | | |
|---|---|---|---|---|
| 5,652,615 A | * | 7/1997 | Bryant et al. | 725/35 |
| 6,191,782 B1 | * | 2/2001 | Mori et al. | 725/37 |
| 6,351,474 B1 | * | 2/2002 | Robinett et al. | 370/486 |
| 6,622,004 B1 | * | 9/2003 | Sonoda et al. | 455/3.05 |

(Continued)

FOREIGN PATENT DOCUMENTS

EP 1 267 580 12/2002

(Continued)

OTHER PUBLICATIONS

European Search Report dated Nov. 28, 2007.

*Primary Examiner* — Pinkal R Chokshi
(74) *Attorney, Agent, or Firm* — Harness, Dickey & Pierce, P.L.C.

(57) ABSTRACT

The present invention relates in particular to a method for processing multimedia content memorised in the form of digital data in at least one multimedia unit. This method includes the following steps:

reception of a program map table containing at least one indication of a proprietary type of data associated to a packet identification data (PID) as well a flag;

reception of a matching table between the flag value and the real type of data;

search for the flag values appearing in the program map table PMT received by the multimedia unit;

search for the corresponding flag values in the matching table between the flag value and the real type of data; and modification of the program map table by replacing the indication of the proprietary type of data of the program map table with the corresponding real type of data of the matching table.

The invention furthermore concerns a method for sending multimedia content in the form of digital data, as well as a multimedia unit for implementing these methods.

11 Claims, 2 Drawing Sheets

U.S. PATENT DOCUMENTS

| | | | | |
|---|---|---|---|---|
| 6,885,680 | B1 * | 4/2005 | Kovacevic et al. | 370/503 |
| 7,318,099 | B2 * | 1/2008 | Stahl et al. | 709/229 |
| 7,376,829 | B2 * | 5/2008 | Ranjan | 713/153 |
| 7,643,508 | B2 * | 1/2010 | Furlong et al. | 370/437 |
| 7,711,249 | B2 * | 5/2010 | Kawasaki et al. | 386/337 |
| 7,900,231 | B2 * | 3/2011 | Paxton et al. | 725/93 |
| 2002/0176512 | A1 * | 11/2002 | Tanaka et al. | 375/295 |
| 2003/0002577 | A1 * | 1/2003 | Pinder | 375/240.01 |
| 2003/0156718 | A1 * | 8/2003 | Candelore et al. | 380/211 |
| 2003/0217362 | A1 * | 11/2003 | Summers et al. | 725/63 |
| 2005/0160177 | A1 | 7/2005 | Kim | |
| 2005/0246735 | A1 * | 11/2005 | Dabrowa | 725/31 |
| 2007/0253509 | A1 | 11/2007 | Tanaka et al. | |

FOREIGN PATENT DOCUMENTS

WO    WO 2005/069296    7/2005

* cited by examiner

FIG. 1
| 1.1 | 1.2 | 1.3 | 1.4 | 1.5 | 1.6 |
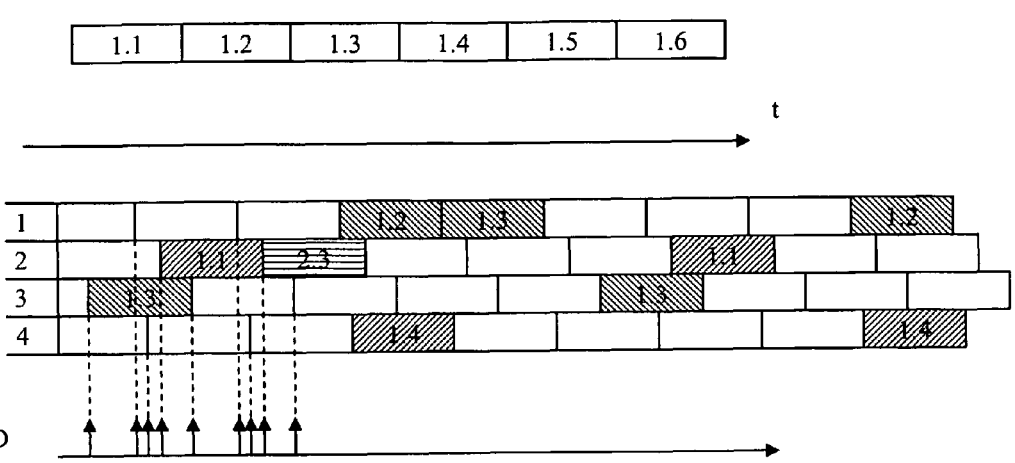
FIG. 2
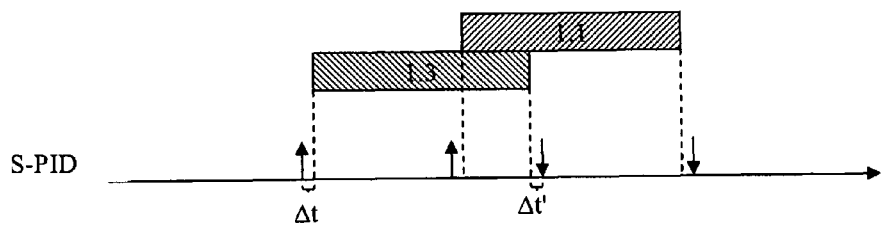
FIG. 3

METHOD FOR SENDING MULTIMEDIA CONTENT TO AT LEAST ONE MULTIMEDIA UNIT, METHOD FOR PROCESSING SAID MULTIMEDIA CONTENT AND MULTIMEDIA UNIT FOR THE IMPLEMENTATION OF THESE METHODS

TECHNICAL FIELD

The present invention relates to the field of the sending, storage and processing of content, in particular of multimedia content such as content related to Pay-TV events, to a plurality of multimedia units for further use. This invention is particularly applied to the case of video on demand in which contents are sent to multimedia units having a storage memory. These contents can be made accessible once their storage is complete or on the contrary, the sending of a key through which they can be used may be required.

PRIOR ART

When contents are broadcast to multimedia units, in particular Pay-TV contents, two approaches are currently used. A first approach is known by the term "carousel". It consists of separating the data to be transmitted into blocks, each block having a header that allows it to be identified. These blocks are sent cyclically to the multimedia units concerned. A multimedia unit memorises these blocks and reconstitutes the data by means of the headers.

This approach is particularly used when the data to be transmitted is of a relatively small size. In particular, it is used to transmit meta-data, game applications or web pages for example. In this approach, the data broadcast speed is not related to the speed of use of this data. This presents the advantage that it is possible to maximise the content of a data block and consequently, to optimize bandwidth.

Another approach allows an audio/video content to be sent, in particular in the form of an Mpeg type stream, to a multimedia unit. According to this approach, the stream is broadcast by a content provider. This stream is received by a multimedia unit, filtered by means of a tuner, processed in a demultiplexer and then stored in a memory such as a hard disk for example, in the multimedia unit.

This approach is particularly suitable for sending large contents, notably of contents related to Pay-TV. The audio/video stream can immediately be interpreted by the multimedia unit. In this case however, it is essential for the data broadcast speed of the to be equal to the use speed. This constraint implies a considerable waste of bandwidth since it is necessary to transmit information packets even if these packets are empty, in such a way that the speeds are adapted. In fact, certain multimedia units use the contents that they receive live, that is to say without storing them on a memory, if these contents are of the audio and/or video type. In this case, if the broadcast throughput fails to correspond to that of the visualisation, the multimedia unit can display a black screen or can be blocked.

The advantage of broadcasting the data according to the carousel principle thus lies in the optimisation of bandwidth use. The drawback of this principle is that it is not developed for transmitting large quantities of data. In fact, if one wishes to transmit large files (of approximately a few GigaBytes) corresponding, for example, to the audio/video content of a complete film, sending them in blocks of a size compatible with the carousel principle, typically of 64 kB, presents two drawbacks. On one hand, each packet contains a header and the ratio of the size of the header in relation to the size of the audio/video content is not very favourable in the sense that considerable bandwidth is used for headers rather than for the audio/video content.

On the other hand, the multimedia unit must process each packet by extracting the content and carrying out the verifications for use. These verifications in particular make it possible to determine if a packet has already been received, to identify the content broadcast etc. The processing of each packet must be analysed at the level of the processing unit CPU, this processing unit is very much in demand, which is not optimal.

DESCRIPTION OF THE INVENTION

The object of the invention is achieved by means of a method for sending multimedia contents in the form of digital data to at least one multimedia unit, this method comprising the following steps:
  separation of the digital data of said multimedia content into content segments;
  integration of service data into these content segments;
  preparation of a program map table PMT, this table containing at least one indication of a real type of data, associated to a packet identification data (PID) as well as a flag, this flag being such that it is not modified between the moment when the table is prepared and the moment of the reception by the multimedia unit;
  modification of the program map table PMT by transforming the indication of the real type of data into a proprietary type of data, the proprietary type of data being such that the multimedia unit does not interpret the data directly;
  sending of at least one content segment to the multimedia unit on a first channel;
  storage of said content segment in a memory of the multimedia unit;
  sending said modified program map table PMT to the multimedia unit;
  sending on a channel second of synchronisation packets that indicate at least the start of the sending of a content segment, an identifier of the content to which this segment is related, an identifier of this segment and an identifier of the first channel;
  sending on said second channel of synchronisation packets that indicate at least the end of the sending of said content segment, an identifier of the content to which this segment is related, a segment identifier and an identifier of the first channel;
  sending of a matching table between the value of the flag and the associated real type of data;
  search for the flag values appearing in the program map table PMT received by the multimedia unit, search of the corresponding flag values in the matching table between the flag value and the associated real type of data and modification of the program map table by replacing the indication of the proprietary type of data of the program map table with the corresponding real type of data of the matching table.

The object of the invention is also achieved by means of a method for processing multimedia contents memorised in the form of digital data in at least one multimedia unit, this method comprising the following steps:
  reception of a program map table containing at least one indication of a proprietary type of data associated to a packet identification data (PID) as well as a flag;
  reception of a matching table between the flag value and the real type of data;

search for the flag values appearing in the program map table PMT received by the multimedia unit;

search for the corresponding flag values in the matching table between the flag value and the real type of data; and modification of the program map table by replacing the indication of the proprietary type of data of the program map table with the corresponding real type of data of the matching table.

The object of the invention is also achieved by means of a multimedia unit including at least one memory intended to memorise multimedia contents in the form of digital data, this multimedia unit being characterised in that it includes:

reception means of a program map table containing at least one indication of a proprietary type of data associated to a packet identification data (PID) as well as a flag;

reception means of a matching table between the flag value and the real type of data;

means allowing the search for the flag values appearing in the program map table PMT received by the multimedia unit;

means allowing the search for the corresponding flag values in the matching table between the flag value and the real type of data; and modification means of the program map table by replacing the indication of the proprietary type of data of the program map table with the corresponding real type of data of the matching table.

According to this invention, audio/video data is broadcast to the users' multimedia units. However, instead of using a standard audio/video format recognised in a conventional way by multimedia units, this data is sent in a particular format that authorises the sending of large blocks or segments. These large segments cannot be used directly by standard multimedia units. Therefore, they are then processed at the level of the multimedia unit so that they may be used.

According to this method, the relation between the size of the audio/video data of a segment or more generally of contents with added value in relation to the size of the service data such as the headers is very advantageous due to the large-sized segments that it is possible to transmit. Moreover, the processing unit CPU load is minimal due to the fact that the majority of processing can be carried out at the hardware level.

The process of the invention also allows bandwidth use to be optimised. In fact, the data sent is not immediately used, but is stored before its use. In this way, it is not necessary for the content of a sent segment to correspond to the use speed of this segment's content. In particular when the audio or the video does not contain information (for example black stripe or no sound) it is not necessary to send empty blocks. This allows segments to have a maximum of useful information.

The method of the invention also makes it possible to take into account the manipulations carried out on the data by the content provider before the broadcast of the contents. In this way, the process is totally transparent for this provider and no modification is required on the part of the provider. The processing of the data is carried out on one hand at the moment when the data is prepared by a management centre and on the other hand at the level of the multimedia unit.

BRIEF DESCRIPTION OF THE DRAWINGS

This invention and its advantages will be better understood with reference to the enclosed Figures and to the detailed description of a particular embodiment, in which:

FIG. 1 shows a content such as a Pay-TV content to be transmitted according to the method of the invention;

FIG. 2 represents the transmission of content in FIG. 1; and

FIG. 3 represents a detail of FIG. 2.

METHODS FOR REALISING THE INVENTION

Figure 4:
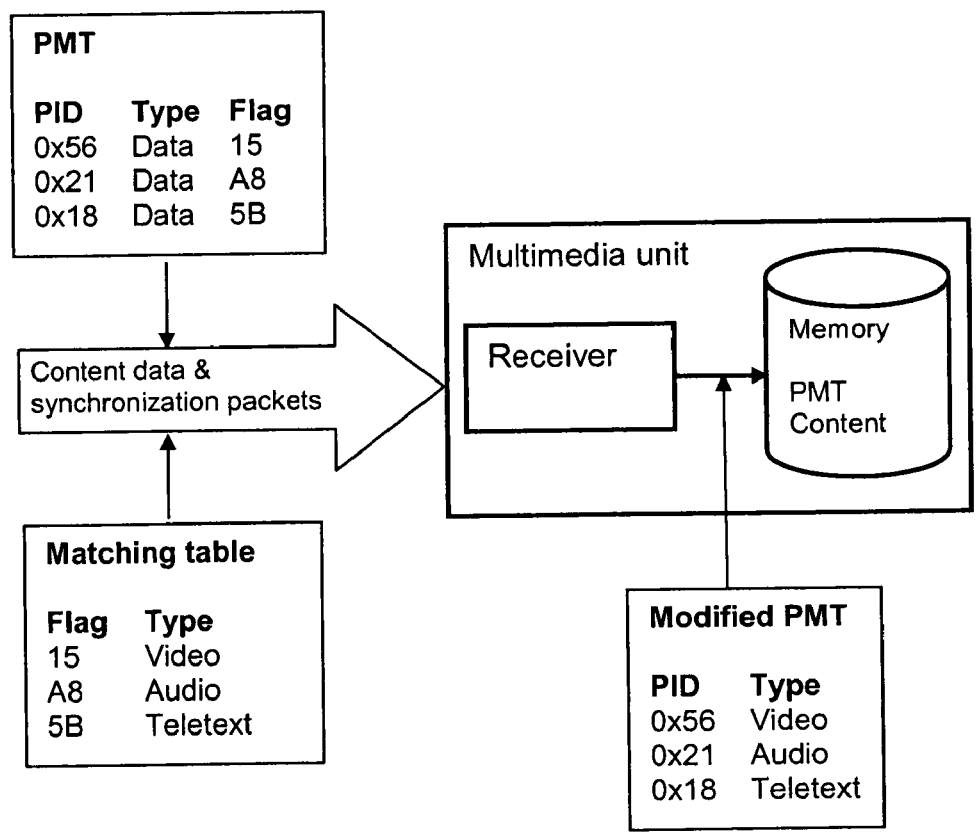
FIG. 4 shows a multimedia unit comprising a receiver and a memory, the receiver being able to modify a program mapping table on a basis of a received program mapping table and a matching table.

FIG. 1 schematically illustrates a multimedia content, for example a Pay-TV content as processed in the present invention. This content is represented as made up of six segments of identical size, numbered 1.1 to 1.6. In this Figure, the length of a segment represents its size in the form of a digital file. The content of each of these segments corresponds to a certain content broadcast time, for example 10 minutes. According to an advantageous embodiment, each segment can contain data that approximately corresponds to a same content broadcast duration. In this case, the files are of equal size. On the contrary, as a determined visualisation time duration does not always correspond to the same broadcast duration, the visualisation duration for each segment is variable.

FIG. 2 shows the way in which multimedia contents are transmitted. These contents are divided into segments, as indicated with reference to FIG. 1. These segments are sent on different channels or services. These services can be different for different segments of the same content. As an example, segment 1.1 is sent on a channel numbered 2, segment 1.2 is sent on channel 1 while segment 1.3 is sent on channel 3. Moreover, the segments are not necessarily broadcast in chronological order. Therefore, in the example illustrated, segment 1.4 is broadcast on the service 4 before segment 1.3 on channel 1. As can be seen in FIG. 2, several segments of different or identical contents can be sent simultaneously, which means that one or several segments can be sent while another segment is sent on another channel. As in the case of the use of a carousel, these segments are resent at regular intervals, in such a way that a multimedia unit which has not received a segment in its totality or all the segments related to a given content can receive the missing elements during a new broadcast of these elements.

The services or channels used for the broadcast of the segments are indicated in a standard way in a program map table (PMT).

Conventionally, this program map table PMT contains packet identification data PID, each of these packets being associated with a real type of data to be transmitted and possibly with a flag. This flag is proprietary and is only interpreted by systems provided for this purpose.

An example of a program map table PMT such as that used in the prior art can take the following form:

| PID  | Type  | Flag |
|------|-------|------|
| 0x18 | Video | 15   |
| 0x19 | Audio | A8   |
| 0x6  | Data  | 5B   |

Audio and video-type data is directly interpreted by the multimedia unit. Data-type data is stored in the multimedia unit and is processed there.

According to the invention, the indication of the type of content transmitted is modified for audio and video data. This data is indicated as being proprietary type, in particular of the Data type. In this way, it is stored in the multimedia unit without being interpreted by the latter. In this way, the resources of the processing unit CPU are not required. The previous program map table thus becomes:

| PID  | Type | Flag |
|------|------|------|
| 0x18 | Data | 15   |
| 0x19 | Data | A8   |
| 0x6  | Data | 5B   |

As it is well-known, the packet identifiers PID can be modified by the content provider before broadcast. Therefore, it is impossible to ensure that a given identifier corresponds to a constant type of data at the time of the preparation of the content and at the time of its reception by a multimedia unit. On the contrary, since the flag has a proprietary format, it cannot be modified by the provider. The table, as illustrated above, could be transformed by the provider into:

| PID  | Type | Flag |
|------|------|------|
| 0x56 | Data | 15   |
| 0x21 | Data | A8   |
| 0x18 | Data | 5B   |

By comparing the table above with the previous table, it is noticeable that the types of data and the flags have not changed while the packet identifier PID has been changed by the provider.

Generally, Data-type data is ignored by multimedia units. In our case, since this data is the audio/video content of the content to be memorised, it is necessary to create a particular mechanism allowing this data to be received, stored and processed.

This mechanism operates in the following way. Shortly before a segment is sent, a synchronisation packet is transmitted with specific packet identification data PID (for instance PID 0x100) common to all the services from the same transport. This is illustrated at the bottom of FIG. 2 and in more detail in FIG. 3 that indicates a shift time Δt between the sending of the synchronisation packet and the start of the sending of the segment. This synchronisation packet, of the Data type and indicated in a standard way in the program map table (PMT), is received by a prescribed software in the multimedia unit. This synchronisation packet describes the content of the next segment that will be broadcast on a given service and indicates the start of its broadcast.

When a synchronisation packet indicates the start of a new segment, the prescribed software is able to determine if the segment in question must be memorised or not. If it must be memorised, the multimedia unit puts into place the filters necessary for receiving this service and storing the content in a memory, without any processing and thus directly by means of a direct access memory DMA.

The synchronisation packet contains a description of the segment and in particular its size, an identifier of the content to which it belongs, the total number of segments associated with the content to which the segment received belongs and the priority information described in detail below. Furthermore, it can contain data related to categories or sub-categories of contents (films—new/westerns, . . . ; sport—football/rugby, . . . ), as well as quality information, also described in detail below.

This synchronisation packet also contains data that allows the reconstruction of the original program map table PMT and in particular the reassigning of the real types of data, in particular "Audio" and "Video" to the information concerned. This "reconstruction" data in the table includes a matching table between the flag value and the real types of data of the associated stream. The update or reconstruction operation of the program map tables PMT is carried out either at the end of each segment or when the segments of a content have all arrived. The flag value is used to modify the type of data. The indication "data" disappears in favour of the real type, audio or video. The reconstructed program map table becomes a visualisation table.

For the table example given above, an update table having the following form is sent:

| Flag | Type  |
|------|-------|
| 15   | Video |
| A8   | Audio |
| 5B   | Data  |

An "inverse" synchronisation packet, illustrated by the arrow pointing towards the bottom of FIG. 3, informs the multimedia unit that the diffusion of the segment is complete. The arrival of this packet then allows the release of the reception of the service and the verification operations of the correct reception of said segment to be carried out. The value of a segment counter is compared with the total number of segments transmitted in the synchronisation packet.

When the totality of the segments of a given content has been received and these segments have been stored correctly in the memory of the multimedia unit, this content can be accessed conventionally. In particular, it can be accessed directly without the need to acquire particular rights or on the contrary without requiring the obtainment of a right or of a key before being able to be used.

According to a particular embodiment of the invention, the correct reception of the entirety of a content is verified. In this embodiment, a comparison is made in particular between the number of audio/video packets actually received for a given content and the total number of packets that this content contains. This total number is indicated in the synchronisation packet. If the real number is higher than the total number, the registration process is stopped. In fact, in this case, it is certain that an error has been made and that data that is not related to the content concerned has been registered.

If the real number is lower than the theoretical total number, this means in principle that segments have not been received. In the method of the invention, it is possible to define a quality index. The latter defines the relation between the quantity of information received and the total quantity of information for a given content. If the quantity of information received for a given content is greater than the quantity of information required by the quality index, the content is considered as stored correctly. On the contrary, if this quantity of information received is lower than that which is demanded by the quality index, it is necessary to memorise more information. This can be carried out while waiting for the rebroadcast of one or several segments missing from the content concerned. In principle, the quality index for a given content is integrated into the corresponding synchronisation packet.

As previously indicated, the sending of the multimedia segments can be carried out on several different services. Moreover, several contents are sent simultaneously or in parallel. Therefore, the segment with the reference 1.1 in FIG. 2 is sent on service 2. It can be followed, on the same service 2, by segment 2.3 corresponding to another multimedia content. Segment 2.3 overlaps with segment 1.2 broadcast on service 1. The method provides for priority management so that certain segments are memorised while others are not.

This priority management can be based on three criteria. The first of these is a priority decided by the user. The user, for example, can indicate if s/he wishes to receive a category of contents, for example new films, while s/he wishes not to receive rugby matches. This criterion is introduced at the level of the multimedia unit.

Another priority is based on the degree of completion of the registration of a content. According to this criterion, if for example 90% of the segments of a content have been registered, the process will favour the registration of the remaining segments of this content over segments of other contents not yet registered. This working mode prevents the registration of numerous segments of different contents without registering the totality of the segments of a content. This criterion is automatically managed by the multimedia unit by means of software.

The third priority criterion is a value introduced by the provider. This value can be introduced for example by favouring the registering of a novelty which has a strong chance of being visualised by a large number of users, to the detriment of contents with restricted usage. The last priority degree is contained in the synchronisation packet.

The combination of these three criteria makes it possible to determine those segments that will be memorised or not.

This invention has been described in an application that acts on data of the real audio and/or video type. However, the method remains valid for any type of data, for example teletext or interactive applications in particular.

The invention claimed is:

1. A method of sending multimedia content in the form of digital data to at least one multimedia unit, the method comprising:

separating the digital data of said multimedia content into a plurality of content segments, said content segments having a proprietary format allowing sending large content data blocks to the at least one multimedia unit;

integrating service data into the plurality of content segments;

preparing a program map table (PMT), the table including at least one indication of a real type of data, associated to a packet identification data and a flag, the flag having a constant value between a moment when the PMT is prepared and a moment the PMT is received by the at least one multimedia unit;

modifying the PMT by transforming the indication of the real type of data into a proprietary type of data, the data indicated as of a proprietary type being stored in a memory of the at least one multimedia unit without being processed by resources of the at least one multimedia unit, the flag remaining unchanged;

sending at least one content segment to the at least one multimedia unit on a first channel;

storing said content segment in a memory of the at least one multimedia unit;

sending said modified program map table PMT to the at least one multimedia unit;

sending on a second channel synchronisation packets that indicate at least the start of the sending of a content segment, an identifier of the content to which this segment is related, an identifier of this segment and an identifier of the first channel;

sending on said second channel additional synchronisation packets indicating at least an end of the sending of said content segment, an identifier of the content to which the content segment is related, a segment identifier and an identifier of the first channel;

sending a matching table of correspondence between a value of the flag and the associated real type of data, the matching table being separate from the PMT;

searching flag values appearing in the PMT received by the at least one multimedia unit;

searching corresponding flag values in the matching table of correspondence between the flag value and the associated real type of data; and modifying the PMT by replacing the indication of the proprietary type of data of the program map table with the corresponding real type of data of the matching table.

2. The method of sending multimedia content according to claim 1, wherein the synchronisation packets include at least one indication amongst: an event identifier, an identifier of the segment of the event, a total number of segments that the event includes, an indication of the start or end of this segment, a total size of the event, an expiration date, a priority and a quality index.

3. The method of sending multimedia content according to claim 1, wherein the real type of data is chosen from among audio, video, teletext or data associated to interactive applications.

4. The method of sending multimedia content according to claim 1, in which a plurality of content segments are sent simultaneously on several different channels, wherein the choice of which segment is memorised to the detriment of other segments sent simultaneously depends on at least one priority rule.

5. The method of sending multimedia content according to claim 1, wherein a priority rule is defined by a category chosen by a user.

6. The method of sending multimedia content according to claim 1, wherein a priority rule depends on the relation between the number of content segments already memorised for a given content and the total number of segments of this content.

7. The method of sending multimedia content according to claim 1, wherein a priority rule is imposed by the content provider.

8. A method of processing multimedia content memorised in the form of digital data in at least one multimedia unit, the method comprising:

receiving a program map table (PMT) including at least one indication of a proprietary type of data associated to a packet identification data, and a flag;

receiving a matching table of correspondence between a value of the flag and an associated real type of data, the matching table being separate from the PMT;

searching the flag values appearing in the PMT received by the at least one multimedia unit;

searching the corresponding flag values in the matching table of correspondence between the flag value and the real type of data; and modifying the PMT by replacing the indication of the proprietary type of data of the PMT with the corresponding real type of data of the matching table.

9. The method of processing multimedia content according to claim 8, wherein for a given content, the number of segments memorised and received is counted and then compared to the total number of segments corresponding to this content.

10. The method of processing multimedia content according to claim 9, wherein the processing of the segments of a content is stopped when the number of segments received exceeds the total number of segments corresponding to this content.

11. A multimedia unit including a receiver and at least one memory configured to memorize multimedia content in the form of digital data,
wherein the receiver is configured to receive a program map table (PMT) and a matching table separated from the PMT, the PMT includes at least one indication of a proprietary type of data associated to a packet identification data and a flag, the matching table includes indications for correspondence between the value of the flag and real type of data, the receiver is further configured to modify the PMT by replacing the indication of the proprietary type of data of the program map table with the corresponding real type of data of the matching table by using the value of the flag included in the PMT and the matching table.

* * * * *